United States Patent
Lee et al.

(10) Patent No.: US 9,611,899 B2
(45) Date of Patent: *Apr. 4, 2017

(54) WEDGE CLUTCH WITH AXIALLY DISPLACEABLE WEDGE PLATE

(71) Applicant: Schaeffler Technologies AG & Co. KG, Herzogenaurach (DE)

(72) Inventors: Brian Lee, York, SC (US); Carsten Ohr, Charlotte, NC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 103 days.

This patent is subject to a terminal disclaimer.

(21) Appl. No.: 14/490,194

(22) Filed: Sep. 18, 2014

(65) Prior Publication Data
US 2015/0083539 A1    Mar. 26, 2015

Related U.S. Application Data

(60) Provisional application No. 61/882,708, filed on Sep. 26, 2013.

(51) Int. Cl.
| F16D 13/06 | (2006.01) |
| F16D 13/14 | (2006.01) |
| F16D 15/00 | (2006.01) |
| F16D 25/08 | (2006.01) |
| F16H 48/10 | (2012.01) |

(52) U.S. Cl.
CPC ............. F16D 13/06 (2013.01); F16D 13/14 (2013.01); F16D 15/00 (2013.01); F16H 48/10 (2013.01); *F16D 25/082* (2013.01)

(58) Field of Classification Search
CPC .......... F16D 13/06; F16D 13/14; F16D 13/18; F16D 13/20; F16D 13/24; F16D 13/15; F16D 13/16; F16D 13/36; F16D 15/00; F16D 25/082
USPC .......................................................... 192/65
See application file for complete search history.

(56) References Cited

U.S. PATENT DOCUMENTS

| 1,172,525 | A | * | 2/1916 | Hanchett | ................. | F16D 13/26 |
| | | | | | | 192/110 R |
| 2,707,108 | A | * | 4/1955 | Schottler | ............. | B23B 31/1177 |
| | | | | | | 188/67 |
| 4,480,490 | A | * | 11/1984 | Inoue | ...................... | F16C 25/02 |
| | | | | | | 192/89.25 |
| 4,560,051 | A | * | 12/1985 | Brandenstein | ........ | F16D 25/083 |
| | | | | | | 192/110 B |
| 2014/0110207 | A1 | | 4/2014 | Davis | | |

(Continued)

*Primary Examiner* — Richard Lorence
(74) *Attorney, Agent, or Firm* — Simpson & Simpson, PLLC

(57) ABSTRACT

A wedge clutch, including: an inner race; an outer race with a first inner circumferential surface sloping radially outward in a first axial direction; a wedge plate disposed between the inner and outer races in a radial direction and including a first outer circumferential surface sloping radially outward in the first axial direction; a first displacement element engaged with the wedge plate and arranged to urge the wedge plate in a second axial direction, opposite the first axial direction, to close the clutch to non-rotatably connect the inner and outer races; and a second displacement element arranged to displace the wedge plate in the first axial direction to open the clutch to enable relative rotation between the inner and outer races.

18 Claims, 6 Drawing Sheets

(56) References Cited

U.S. PATENT DOCUMENTS

2015/0014113 A1* 1/2015 Ohr ................... F16D 13/14
 192/70.23
2015/0152922 A1* 6/2015 Lee ................... F16D 13/14
 192/66.1

* cited by examiner

US 9,611,899 B2

WEDGE CLUTCH WITH AXIALLY DISPLACEABLE WEDGE PLATE

CROSS-REFERENCE TO RELATED APPLICATIONS

This application claims the benefit under 35 U.S.C. §119 (e) of U.S. Provisional Patent Application No. 61/882,708, filed Sep. 26, 2013, which application is incorporated herein by reference in its entirety.

TECHNICAL FIELD

The present disclosure relates to a wedge clutch using an axially displaceable wedge plate to lock inner and outer races. In particular, the clutch eliminates torque drag between the inner and outer races in a free-wheel mode while enabling rapid and consistent switching to a locking mode from the free-wheel mode.

BACKGROUND

It is known to use a dog clutch to connect a torque transmitting device, such as a differential carrier to a power shaft. However, a dog clutch requires a relatively long axial space for actuation and is prone to teeth clash or blocking.

SUMMARY

According to aspects illustrated herein, there is provided a wedge clutch, including: an inner race including a first outer circumferential surface; an outer race with a first inner circumferential surface; a wedge plate disposed between the inner and outer races in a radial direction and including second inner and outer circumferential surfaces; a first displacement element engaged with the wedge plate and arranged to urge the wedge plate in a second axial direction, opposite the first axial direction, to close the clutch to non-rotatably connect the inner and outer races; and a second displacement element arranged to displace the wedge plate in the first axial direction to open the clutch to enable relative rotation between the inner and outer races. The first inner circumferential surface and the second outer circumferential surface each slope radially outward in the first axial direction; or the second inner circumferential surface and the first outer circumferential surface each slope radially outward in the second radial direction.

According to aspects illustrated herein, there is provided a wedge clutch, including: an inner race; an outer race with an inner circumferential surface sloped radially outward in the first axial direction; a wedge plate disposed between the inner and outer races in a radial direction and including an outer circumferential surface substantially parallel to the inner circumferential surface; a first displacement element engaged with the wedge plate and arranged to urge the wedge plate in a second axial direction, opposite the first axial direction, to close the clutch to non-rotatably connect the inner and outer races; and a second displacement element arranged to displace the wedge plate in the first axial direction to open the clutch to enable relative rotation between the inner and outer races.

According to aspects illustrated herein, there is provided a wedge clutch assembly, including: an inner race with an outer circumferential surface sloped radially outward in a first axial direction; an outer race; a wedge plate disposed between the inner and outer races in a radial direction and including an inner circumferential surface substantially parallel to the outer circumferential surface; a first displacement element engaged with the wedge plate and arranged to urge the wedge plate in a second axial direction, opposite the first axial direction, to close the clutch to non-rotatably connect the inner and outer races; and a second displacement element arranged to displace the wedge plate in the first axial direction to open the clutch to enable relative rotation between the inner and outer races.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 1A:
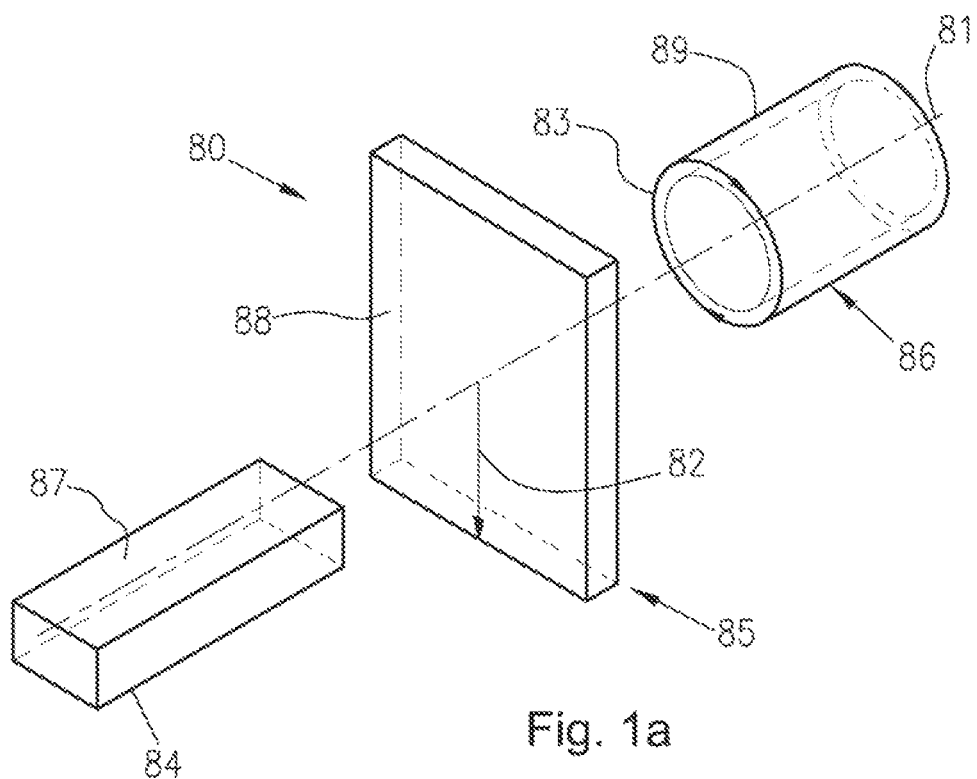
FIG. 1A is a perspective view of a cylindrical coordinate system demonstrating spatial terminology used in the present application.

FIG. 1A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumferential surface 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumferential surface 83 forms a line along the surface. As a further example, axial movement or disposition is parallel to axis 81, radial movement or disposition is parallel to radius 82, and circumferential movement or disposition is parallel to circumferential surface 83. Rotation is with respect to axis 81.

The adverbs "axially," "radially," and "circumferentially" are with respect to an orientation parallel to axis 81, radius 82, or circumferential surface 83, respectively. The adverbs "axially," "radially," and "circumferentially" also are regarding orientation parallel to respective planes.

Figure 1B:
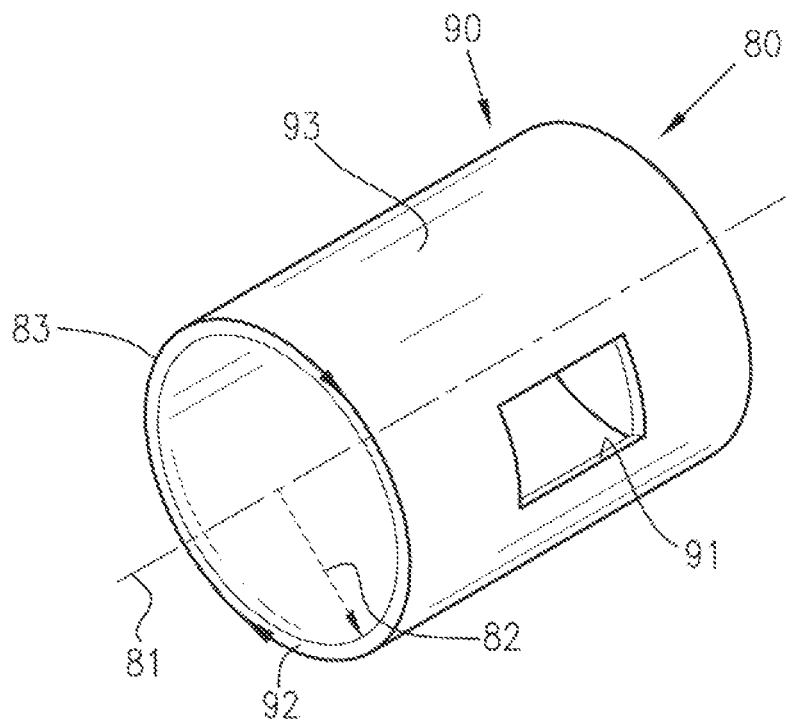
FIG. 1B is a perspective view of an object in the cylindrical coordinate system of FIG. 1A demonstrating spatial terminology used in the present application.

FIG. 1B is a perspective view of object 90 in cylindrical coordinate system 80 of FIG. 1A demonstrating spatial terminology used in the present application. Cylindrical object 90 is representative of a cylindrical object in a cylindrical coordinate system and is not intended to limit the present invention in any manner. Object 90 includes axial surface 91, radial surface 92, and circumferential surface 93. Surface 91 is part of an axial plane, surface 92 is part of a radial plane, and surface 93 is a circumferential surface.

Figure 2:
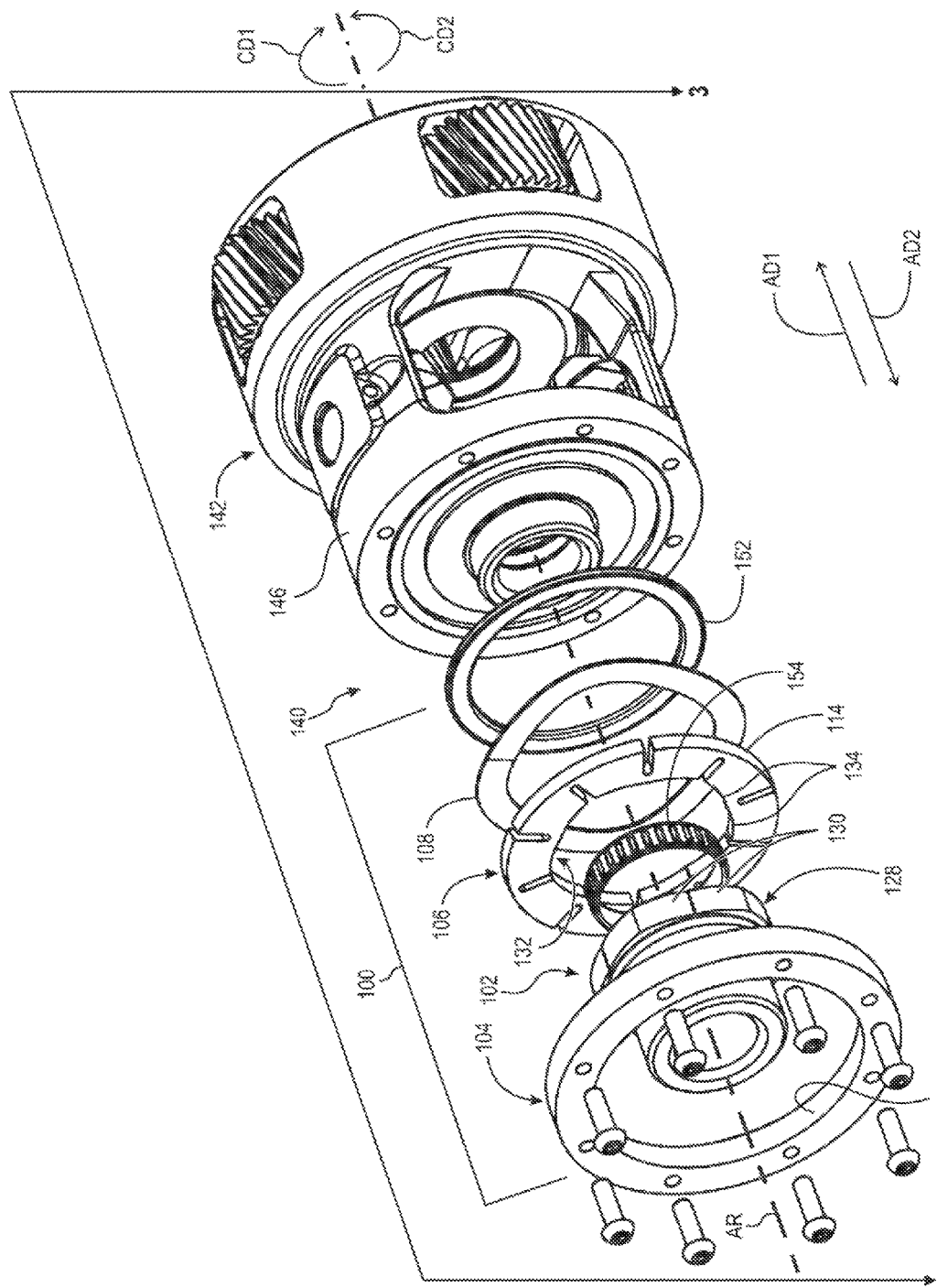
FIG. 2 is an exploded perspective view of differential carrier including a wedge clutch with an axially displaceable wedge plate with a tapered outer circumference.

FIG. 2 is an exploded perspective view of differential carrier including wedge clutch 100 with an axially displaceable wedge plate.

Figure 3:
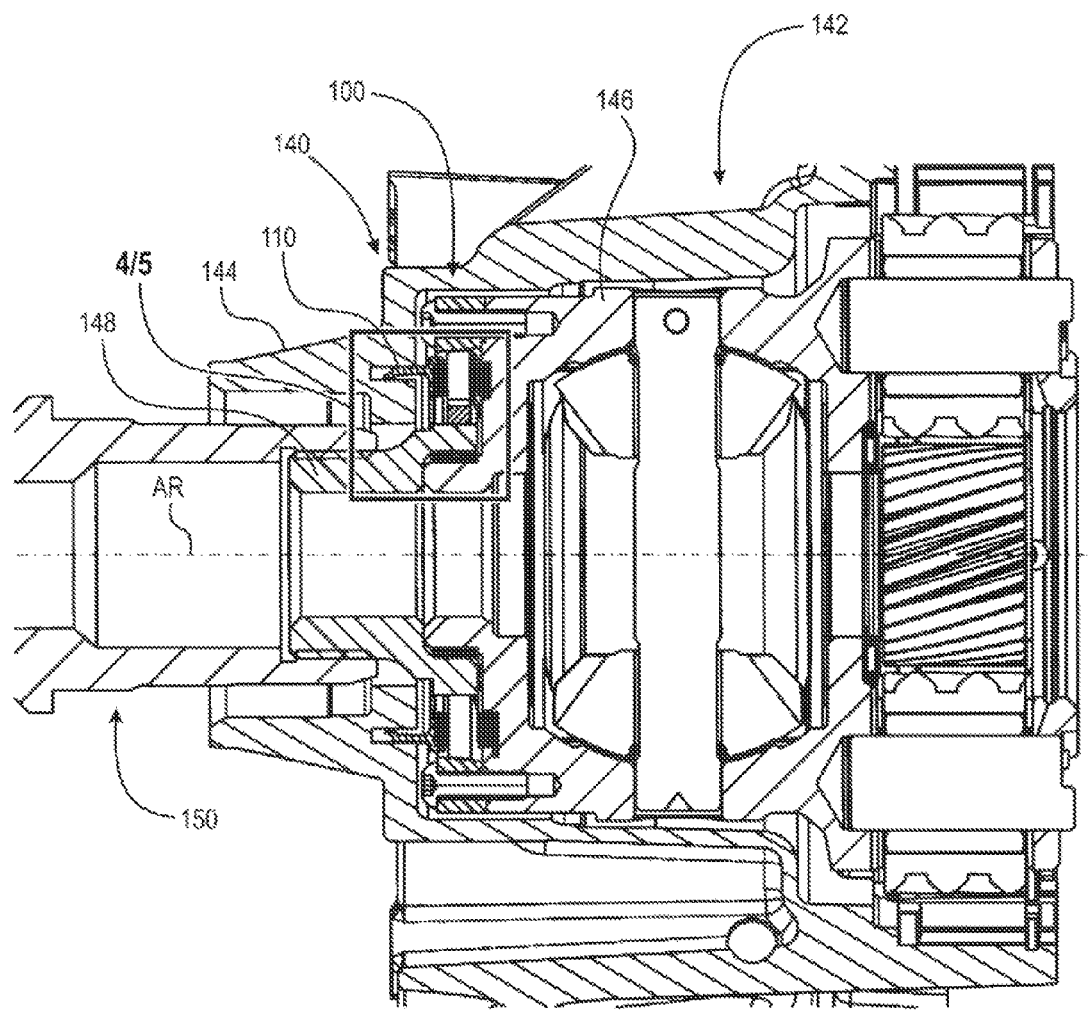
FIG. 3 is a cross-sectional view of the differential carrier and wedge clutch generally along line 3-3 in FIG. 2.

FIG. 3 is a cross-sectional view of the differential carrier and wedge clutch 100 generally along line 3-3 in FIG. 2.

Figure 4:
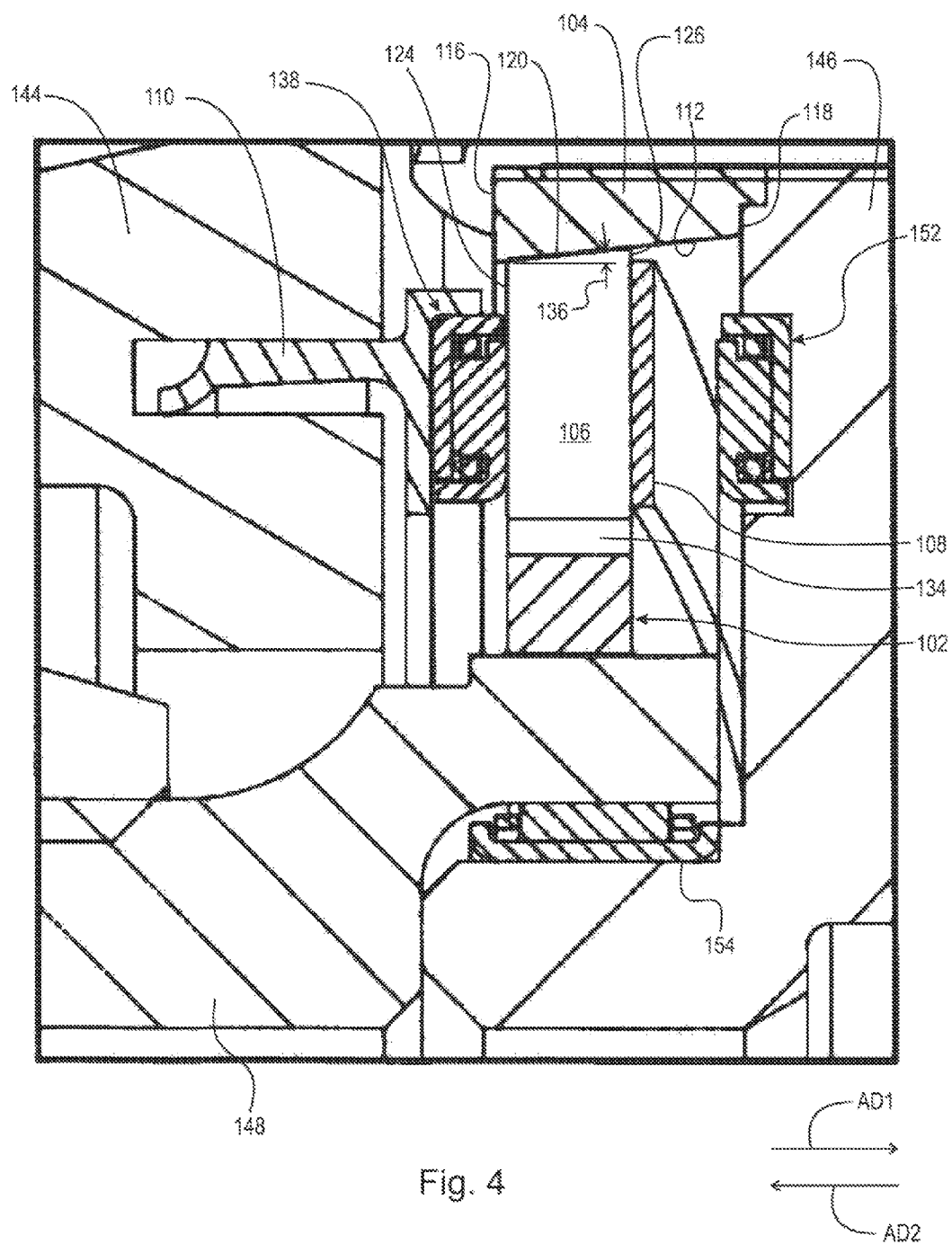
FIG. 4 is a detail of area 4/5 in FIG. 3 showing the wedge clutch in a closed mode.

FIG. 4 is a detail of area 4/5 in FIG. 3 showing wedge clutch 100 in a closed mode. The following should be viewed in light of FIGS. 2 through 4. Wedge clutch 100 includes inner race 102, outer race 104, wedge plate 106, displacement element 108, and displacement element 110. In an example embodiment, element 108 is any resilient element known in the art and element 110 is any piston known in the art. It should be understood that the preceding configuration can be reversed such that a piston displaces wedge plate 106 in direction AD2 and a resilient element displaces the wedge plate in direction AD1. Outer race 104 includes inner circumferential surface 112 sloping radially outward in axial direction AD1. That is, a radial distance of surface 112 from axis of rotation AR increases between radially disposed side 116 and radially disposed side 118. The wedge plate includes outer circumferential surface 120 sloping radially outward in axial direction AD1. That is, a radial distance of surface 120 from axis AR increases between radially disposed side 124 and radially disposed side 126. Resilient element 108 is engaged with the wedge plate, for example in contact with the wedge plate surface 114, and urges the wedge plate in axial direction AD2, opposite axial direction AD1. The piston is arranged to displace the wedge plate in axial direction AD1. In an example embodiment, clutch 100 includes a single wedge plate 106.

For a closed mode for the clutch in which inner race 102 is non-rotatably connected to outer race 104: resilient element 108 displaces wedge plate 106 in axial direction AD2; outer circumferential surface 120 contacts inner circumferential surface 112; and, wedge plate 106 non-rotatably connects inner race 102 and outer race 104.

Figure 5:
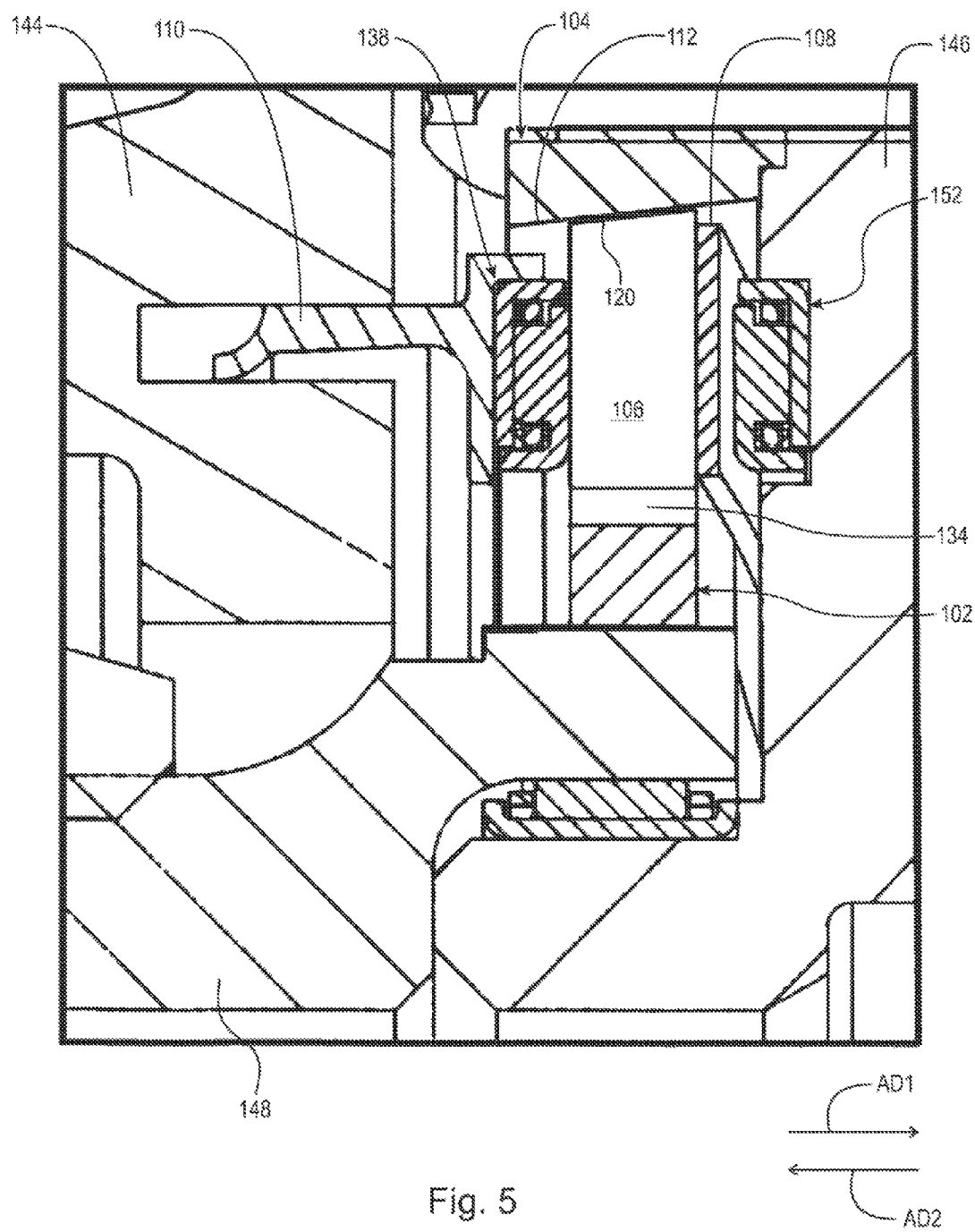
FIG. 5 is a detail of area 4/5 in FIG. 3 showing the wedge clutch in an open mode; and, FIG. 6 is a detail similar to FIG. 5 showing a wedge clutch with an axially displaceable wedge plate with a tapered inner circumference in an open mode.

FIG. 5 is a detail of area 4/5 in FIG. 3 showing wedge clutch 100 in an open mode. The following should be viewed in light of FIGS. 2 through 5. To switch to an open mode for the clutch: piston 110 displaces the wedge plate in axial direction AD1; outer circumferential surface 120 breaks contact with inner circumferential surface 112; and inner race 102 and outer race 104 are rotatable with respect to each other. To switch from the open mode to the closed mode: piston 110 displaces in axial direction AD2; resilient element 108 displaces the wedge plate in axial direction AD2; and outer circumferential surface 120 non-rotatably connects to inner circumferential surface 112. Any means known in the art can be used to displace piston 110 including hydraulic, pneumatic, or electrical actuation.

In an example embodiment, inner race 102 includes outer circumferential surface 128 with circumferentially sloping ramps 130, and wedge plate 106 includes inner circumferential surface 132 with circumferential sloping ramps 134 engaged with ramps 130. In the open mode, ramps 130 and 134 are engaged and the wedge plate is non-rotatably connected to the inner race. As noted above, to switch from the open mode to the closed mode, resilient element 108 displaces the wedge plate in axial direction AD2. As surface 112 contacts 120, friction force between the surfaces, in combination with the relative rotation of race 102 and wedge plate 106 with respect to outer race 104, causes wedge plate 106 to rotate with outer race 104 and relative to inner race 102. The relative rotation of wedge plate 106 with respect to race 102 causes ramps 130 to rotate with respect to ramps 134, in particular to slide up ramps 134 expanding wedge plate 106 radially outward. The outward expansion causes wedge plate 106 to non-rotatably connect to the inner and outer races.

The relative rotation between inner race 102 and wedge plate 106 and outer race 104 can be in circumferential direction CD1 or CD2 due to the configuration of ramps 130 and 134. That is, in either of directions CD1 or CD2, rotation of the wedge plate with respect to the inner race causes respective pairs of ramps 130 and 134 to slide across each other and expand the wedge plate radially outward. It should be understood that the relative rotation between inner race 102 and wedge plate 106 and outer race 104 can include inner race 102 and wedge plate 106 and outer race 104 rotating in the same circumferential direction but at different speeds, or in opposite circumferential directions. The relative rotation between inner race 102 and wedge plate 106 and outer race 104 also can include one of inner race 102 or wedge plate 106 and outer race 104 not rotating.

In an example embodiment, clutch 100 is self-locking. That is, once surfaces 112 and 120 are non-rotatably engaged to close the clutch, angle 136 of the slope of surface 112 and 120 and the coefficient of friction between surface 112 and 120 is such that axial force is not required to prevent wedge plate 106 for displacing in direction AD1 to disconnect surfaces 112 and 120 and opening clutch 100.

In an example embodiment, piston 110 is non-rotatable, that is, rotationally fixed, and clutch 100 includes thrust bearing 138 axially disposed between the piston and the wedge plate to enable relative rotation between the piston and the wedge plate.

In an example embodiment, clutch 100 is part of a clutch assembly 140, which in turn is part of a larger apparatus, for example, differential carrier 142. For example, assembly 140 includes non-rotatable component 144, in this example, a housing for carrier 142, and rotatable component 146, in this example, a portion of a power shaft for carrier 142. Wedge clutch 100 is axially disposed between components 144 and 146. Outer race 104 is non-rotatably connected to component 146 and inner race 102 is non-rotatably connected to portion 148 of input shaft 150 for carrier 142. Piston 110 is at least partially located in component 144. Bearing 138 is engaged with the piston and wedge plate 106 and enables rotation of wedge plate 106 with respect to rotationally fixed piston 110. Thrust bearing 152 is engaged with component 146 and the wedge plate and enables relative rotation between wedge plate 106 and component 146. Operation of clutch 100 is as described above. Bearing 154 enable rotation between components 146 and 148.

Thus, in the example of the differential carrier, in the open mode for clutch 100, input shaft 150 is rotatable with respect to component 146 and power is not transmitted to component 146. In the closed mode for clutch 100, shaft 150 is non-rotatably connected to component 146 and torque is transmitted from shaft 150 to carrier 142.

Figure 6:
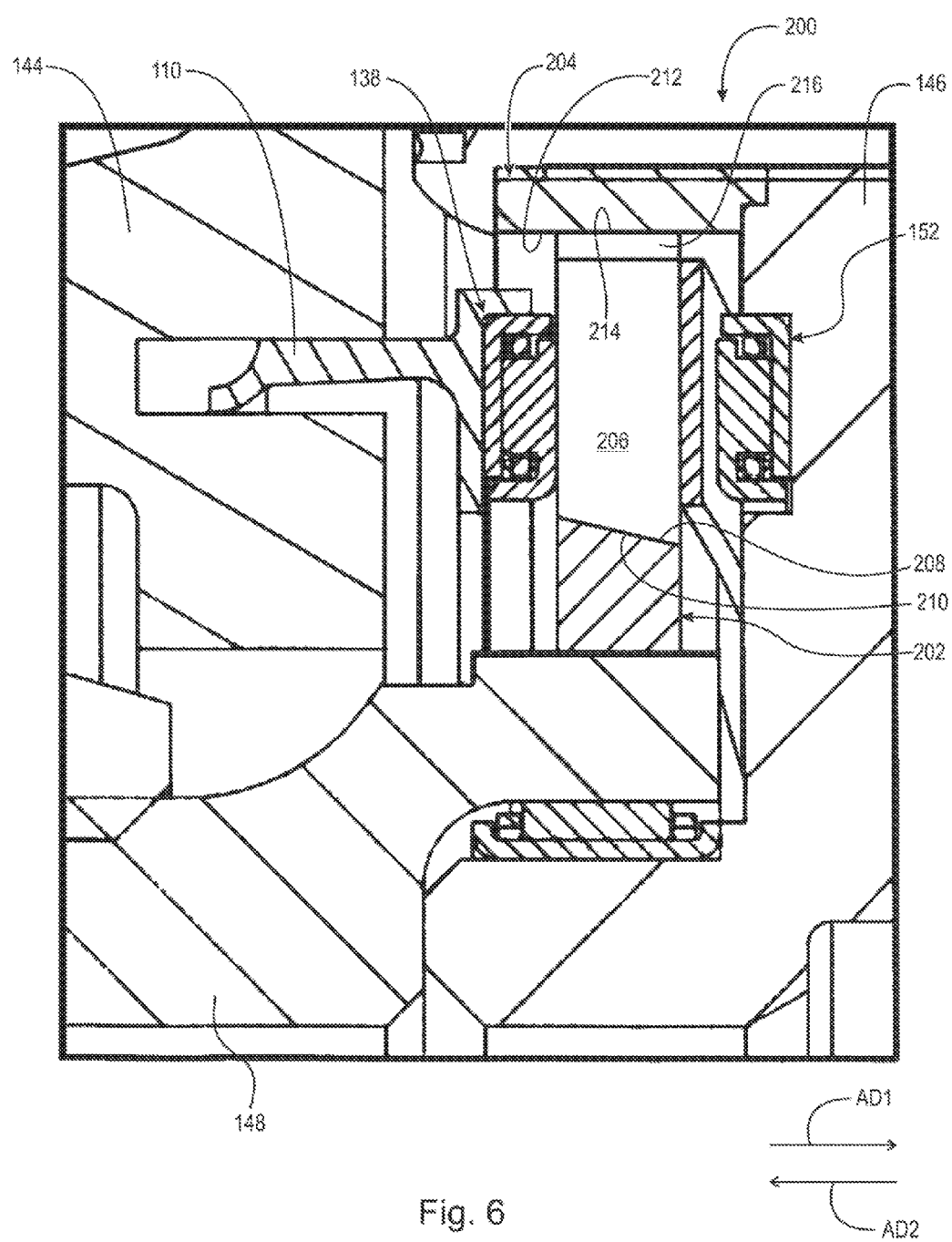

FIG. 6 is a detail similar to FIG. 5 showing wedge clutch 200 with an axially displaceable wedge plate with a tapered inner circumference in an open mode. The discussion for FIGS. 2 through 5 is applicable to wedge clutch 200 except as noted. Clutch 200 includes inner race 202, outer race 204, and wedge plate 206; the remainder of the components of clutch 200 are substantially the same as those for clutch 100.

Inner race 202 includes outer circumferential surface 208 sloping radially inward in axial direction AD1. The wedge plate includes inner circumferential surface 210 sloping radially inward in axial direction AD1.

For a closed mode for the clutch in which inner race 202 is non-rotatably connected to outer race 204: resilient element 108 displaces wedge plate 206 in axial direction AD2; inner circumferential surface 210 contacts outer circumferential surface 208; and, wedge plate 206 non-rotatably connects inner race 202 and outer race 204.

To switch to an open mode for the clutch: piston 110 displaces the wedge plate in axial direction AD1; inner circumferential surface 210 breaks contact with outer circumferential surface 208; and inner race 202 and outer race 204 are rotatable with respect to each other. To switch from the open mode to the closed mode: piston 110 displaces in axial direction AD2; resilient element 108 displaces the wedge plate in axial direction AD2; and inner circumferential surface 210 non-rotatably connects to outer circumferential surface 208.

In an example embodiment, outer race 204 includes inner circumferential surface 212 with circumferentially sloping ramps, and wedge plate 206 includes outer circumferential surface 214 with circumferential sloping ramps 216 engaged with the ramps for surface 212. In the open mode, ramps 216 and the ramps for surface 212 are engaged and the wedge plate is non-rotatably connected to the outer race. As noted above, to switch from the open mode to the closed mode, resilient element 108 displaces the wedge plate in axial direction AD2. As surface 208 contacts surface 210, friction force between the surfaces, in combination with the relative rotation of race 204 and wedge plate 206 with respect to race 202, causes wedge plate 206 to rotate with race 202 and relative to race 204. The relative rotation of wedge plate 206 with respect to race 204 causes ramps 216 to rotate with respect to the ramps for surface 212, in particular to slide up the ramps for surface 212, compressing wedge plate 206 radially inward. The inward expansion causes wedge plate 206 to non-rotatably connect to the inner and outer races.

The following discussion is directed to clutch 100; however, it should be understood that the discussion is applicable to clutch 200 as well. Advantageously, in the open mode for clutch 100, piston 110 displaces wedge plate 106 in direction AD1 so that surfaces 112 and 120 are free of contact or have only nominal contact. Thus, in the open mode, there is little or no drag loss caused by contact between surfaces 112 and 120. Further, clutch 100 enables rapid and consistent connection of races 102 and 104. Resilient element 108 needs only to apply a relatively small amount of axial force to displace wedge plate 106 a relatively small axial distance to contact race 104. Once contact is made, the self-locking aspect of wedge plate 106 and race 104 ensures a rapid and stable non-rotatable connection of the inner and outer races.

As well, due to the self-locking aspect of clutch 100, there is no need to apply axial force in direction AD2 to hold the wedge plate in the closed position. Thus, there is no need for an active element to provide such force, reducing complexity and energy requirements, and in the alternative, there is no need for element 108 to provide such force beyond what is needed to displace the wedge plate to initiate contact with the outer race. As a further result, piston 110 does not need to overcome a holding force from an active element or element 108 to displace the wedge to initiate the open mode, reducing the energy requirement for the piston.

Surfaces 112 and 120 are shown sloping radially outward in direction AD1; however, it should be understood that the slopes of the surfaces could be reversed such that surfaces 112 and 120 slope radially outward in direction AD2.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What we claim is:

1. A wedge clutch, comprising:
   an inner race including a first outer circumferential surface, the first outer circumferential surface including a first plurality of circumferentially sloping ramps;
   an outer race with a first inner circumferential surface;
   a wedge plate:
      disposed between the inner and outer races in a radial direction;
      at least partially rotatable with respect to the inner and outer races; and,
      including second inner and outer circumferential surfaces, the second inner circumferential surface including a second plurality of circumferential sloping ramps engaged with the first plurality of circumferentially sloping ramps;
   a first displacement element engaged with the wedge plate and arranged to urge the wedge plate in a second axial direction, opposite a first axial direction, to close the clutch to non-rotatably connect the inner and outer races; and,
   a second displacement element arranged to displace the wedge plate in the first axial direction to open the clutch to enable relative rotation between the inner and outer races, wherein the first inner circumferential surface and the second outer circumferential surface each slope radially outward in the first axial direction.

2. The clutch as recited in claim 1, wherein the wedge plate comprises only one single wedge plate.

3. The clutch as recited in claim 1, wherein the first displacement element is a resilient element and the second displacement element is a piston.

4. The clutch as recited in claim 3, wherein the first inner circumferential surface is arranged to contact the second outer circumferential surface in response to the resilient element displacing the wedge plate in the second axial direction and the wedge plate is arranged to non-rotatably connect to the inner and outer races in the closed mode.

5. The clutch as recited in claim 3, wherein the first inner circumferential surface is arranged to break contact with the second outer circumferential surface in response to the piston displacing the wedge plate in the first axial direction.

6. The clutch as recited in claim 3, further comprising:
a bearing axially disposed between the piston and the wedge plate to enable relative rotation between the piston and the wedge plate.

7. The clutch as recited in claim 1, wherein to switch from the open mode to the closed mode, the second displacement element is arranged to displace in the second axial direction.

8. The clutch as recited in claim 1, wherein in the closed mode for the clutch, axial force on the wedge plate in the second direction is not needed to maintain the non-rotatable connection of the inner and outer races.

9. The clutch as recited in claim 1, wherein:
the first inner circumferential surface includes first and second ends furthest in the first and second axial directions, respectively and the second end is closer, in a radial direction, than the first end to an axis of rotation for the clutch; and,
the second outer circumferential surface includes first and second ends furthest in the first and second axial directions, respectively and the second end is closer, in a radial direction, than the first end to an axis of rotation for the clutch.

10. The clutch as recited in claim 1, wherein:
to switch from the open mode to the closed mode:
the second displacement element is arranged to displace in the second axial direction;
the first displacement element is arranged to displace the wedge plate in the second axial direction;
the second outer circumferential surface is arranged to contact the first inner circumferential surface;
the wedge plate is arranged to rotate with respect to the inner race; and,
the second plurality of circumferential sloping ramps is arranged to slide across the first plurality of circumferential sloping ramps to expand the wedge plate radially outward.

11. A wedge clutch, comprising:
an inner race including a first outer circumferential surface;
an outer race with a first inner circumferential surface, the first inner circumferential surface including a first plurality of circumferentially sloping ramps;
a wedge plate:
disposed between the inner and outer races in a radial direction;
at least partially rotatable with respect to the inner and outer races; and,
including second inner and outer circumferential surfaces, the second outer circumferential surface including a second plurality of circumferential sloping ramps engaged with the first plurality of circumferentially sloping ramps;
a first displacement element engaged with the wedge plate and arranged to urge the wedge plate in a second axial direction, opposite a first axial direction, to close the clutch to non-rotatably connect the inner and outer races; and,
a second displacement element arranged to displace the wedge plate in the first axial direction to open the clutch to enable relative rotation between the inner and outer races, wherein the second inner circumferential surface and the first outer circumferential surface each slope radially outward in the second axial direction.

12. The clutch as recited in claim 11, wherein the first displacement element is a resilient element and the second displacement element is a piston, wherein the second inner circumferential surface is arranged to contact the first outer circumferential surface in response to the resilient element displacing the wedge plate in the second axial direction and the wedge plate is arranged to non-rotatably connect to the inner and outer races in the closed mode.

13. The clutch as recited in claim 12, wherein the second inner circumferential surface is arranged to break contact with the first outer circumferential surface in response to the piston displacing the wedge plate in the first axial direction.

14. The clutch as recited in claim 11, wherein:
the first outer circumferential surface includes first and second ends furthest in the first and second axial directions, respectively and the first end is closer, in a radial direction, than the second end to an axis of rotation for the clutch; and,
the second inner circumferential surface includes first and second ends furthest in the first and second axial directions, respectively and the first end is closer, in a radial direction, than the second end to an axis of rotation for the clutch.

15. The clutch as recited in claim 11, wherein:
to switch from the open mode to the closed mode:
the second displacement element is arranged to displace in the second axial direction;
the first displacement element is arranged to displace the wedge plate in the second axial direction;
the second inner circumferential surface is arranged to contact the first outer circumferential surface;
the wedge plate is arranged to rotate with respect to the outer race; and,
the second plurality of circumferential sloping ramps is arranged to slide across the first plurality of circumferential sloping ramps to compress the wedge plate radially inward.

16. A wedge clutch, comprising:
an inner race including a first outer circumferential surface, the first outer circumferential surface including a first plurality of circumferentially sloping ramps;
an outer race with a first inner circumferential surface sloped radially outward in a first axial direction;
a wedge plate:
disposed between the inner and outer races in a radial direction;
at least partially rotatable with respect to the inner and outer races; and,
including second inner and outer circumferential surfaces, the second inner circumferential surface including a second plurality of circumferential sloping ramps engaged with the first plurality of circumferentially sloping ramps, the second outer circumferential surface substantially parallel to the first inner circumferential surface;
a first displacement element engaged with the wedge plate and arranged to urge the wedge plate in a second axial direction, opposite the first axial direction, to close the clutch to non-rotatably connect the inner and outer races; and,
a second displacement element arranged to displace the wedge plate in the first axial direction to open the clutch to enable relative rotation between the inner and outer races.

17. The clutch as recited in claim 16, wherein the first displacement element is a resilient element and the second displacement element is a piston.

18. The clutch as recited in claim 16, wherein:
to close the clutch:

the first displacement element is arranged to displace the wedge plate in the second axial direction;
the second outer circumferential surface is arranged to contact the first inner circumferential surface; and,
the wedge plate is arranged to non-rotatably connect to the inner and outer races;

to open the clutch:
the second displacement element is arranged to displace the wedge plate in the first axial direction; and,
the second outer circumferential surface is arranged to break contact with the first inner circumferential surface; and, to close the clutch from an open mode for the clutch:
the second displacement element is arranged to displace in the second axial direction;
the first displacement element is arranged to displace the wedge plate in the second axial direction; and,
the second outer circumferential surface is arranged to non-rotatably connect to the first inner circumferential surface.

* * * * *